United States Patent [19]

Schuster

[11] 3,902,435

[45] Sept. 2, 1975

[54] METHOD OF INCINERATING PRE-TREATED INDUSTRIAL WASTES

[75] Inventor: Ernst Schuster, Gummersbach, Germany

[73] Assignee: L. & C. Steinmuller GmbH, Gummersbach, Germany

[22] Filed: Jan. 21, 1974

[21] Appl. No.: 435,089

[30] Foreign Application Priority Data
Jan. 23, 1973 Germany............................ 2303140

[52] U.S. Cl. .................. 110/7 R; 110/8 P; 241/18; 241/23
[51] Int. Cl.² ......................................... F23G 7/00
[58] Field of Search............ 110/8 R, 8 C, 8 P, 7 R; 241/18, 23

[56] References Cited
UNITED STATES PATENTS

| 2,879,005 | 3/1959 | Jarvis................................ 241/23 X |
| 3,457,881 | 7/1969 | Test et al................................ 110/7 |
| 3,685,467 | 8/1972 | Morrill...................................... 110/8 |
| 3,718,284 | 2/1973 | Richardson............................ 241/23 |
| 3,734,036 | 5/1973 | Abos......................................... 110/8 |
| 3,736,111 | 5/1973 | Gardner et al...................... 110/8 X |
| 3,771,729 | 11/1973 | Frable................................... 241/23 |

*Primary Examiner*—Kenneth W. Sprague
*Attorney, Agent, or Firm*—Walter Becker

[57] ABSTRACT

A method of incinerating pretreated industrial waste, according to which the wastes conveyed to the incinerator in containers is pretreated either by deep-freezing the wastes or by volatilizing the wastes under exclusion of air, or by mixing the wastes with substances of addition or with leaning substances, e.g., mud, ash, sand, wood shavings, whereupon the thus obtained wastes, either reduced in size or in volatilized condition are fed into the fire chamber of the incinerator.

7 Claims, No Drawings

METHOD OF INCINERATING PRE-TREATED INDUSTRIAL WASTES

The present invention relates to a method of burning pretreated industrial wastes which are fed into an incinerator as packages of different content and unknown composition. Whereas refuse considered over a longer period of time is a waste of a defined and uniform composition, industrial waste, especially waste from the chemical industry differs not only from plant to plant but also within the plant from hour to hour. The burning of house refuse is effected in incinerators generally without any problems. On the other hand, the burning of industrial waste, particularly of the chemical industry, presents the operator of such incinerators with problems that are not easy to solve. This is due to the character and composition of this type of waste in contrast to house refuse. Chemical waste for instance has a higher heating power. Moreover, chemical waste is obtained in a more solid paste-like or liquid form and has corrosive properties. Frequently it smells very strong and the waste is highly toxic, may have the tendency to self-ignite and, in contrast to house refuse, the chemical waste cannot be intermixed in a bunker and can be introduced into the incinerator chambers only by means of specially designed devices. Chemical waste contains atoms in its molecules which when being incinerated emit air-foreign substances so that the flue gases have to be subjected to a washing operation. This characterization of these wastes and this distinction over house refuse is by no means complete. It is merely intended to draw attention to the fact that incinerators for industrial wastes, especially for chemical wastes differ fundamentally and considerably from ordinary refuse incinerators in construction, methods of operation, number of processing stages, type of process, liability to disorders, organization in the supply and chemical-physical control, and investing and operating costs.

With a certain group of waste, namely waste from laboratories, application technical departments, test operations and others, the supply of the waste is effected in containers of different sizes of wood, steel sheet, synthetic material, etc. Heretofore, wastes of this type were deposited in containers or barrels on so-called "safe" places of deposit. However, laws governing ecology will eventually force the incineration of such deposits or wastes.

Literature has heretofore not disclosed any methods which make possible a complete, i.e., soot-free incineration of the wastes involved and deposited in containers, barrels or the like, especially disagreeable waste substances. It is for this reason that useful methods of incinerating wastes of the above mentioned type are of particular interest.

The tendency of reaction, especially of chemical waste, is in part very high. An intermixing of these substances is, therefore, not possible for the sake of safety. For quite some time, therefore, these waste materials have been deposited in the above mentioned packages or barrels of different sizes and have been transported therein. Aside from the fact that these one-way barrels have to be bought, in particular, this method is at least for the time being the most favorable method for the transport to an incinerator. On the other hand, this results automatically in a number of difficulties which do not occur with the burning for instsance of liquid substances such as old oil delivered in tank cars. These defined waste liquids such as old oil can be pumped to the burners for the combustion chamber or can be pressed thereinto by inert gases. For waste substances in packages, barrels, etc., this possibility does not exist. Therefore, other ways and means have to be selected.

Methods have become known according to which the containers, barrels, etc., are conveyed into a fire chamber or burning chamber by means of specific charge traps in a discontinuous manner.

According to one of these methods, the packages, barrels or the like are as an entirety through a trap thrown into a rotary furnace in a discontinuous manner after opening up the closure or after manually providing some openings in their cover or lid.

With this type of charging the furnace, the package or barrel bursts or the closure springs off. The liquid content shoots into the fire chamber and evaporates at a differently fast rate depending on the composition of the waste, and this happens frequently spontaneously. The supply of oxygen in the fire chamber does not exceed the likewise spontaneously occurring combustion per time unit. The oxygen supply is particularly with quickly reacting waste substances too small up to two digits. The result is a highly incomplete combustion. Soot is formed which, once formed, will not burn in the post burning chamber nor can it be removed by a following electrofilter or a flue gas wash.

The soot leaves the chimney in the form of a black cloud which is visible for some seconds over a considerable area after the barrel the like has been charged into the combustion chamber.

Due to the explosion-like evaporation and combustion of different waste substances, pressure shocks are caused in the incinerator which pressure shocks over longer periods of time may damage the incinerator and thereby cause danger to the operating personnel.

According to another method, the procedure is similar. The liquid content of the barrel or the like is poured into a rotary pipe by tilting the barrel, and the barrel content is subsequently passed into the fire chamber. Also in this instance similar occurrences have to be coped with as with the above mentioned method.

There has also become known a method of treating municipal waste according to which the waste is coked at the place where it forms. The drawback of this known method consists primarily in that in addition to the coking residues, also gases and vapors form which, while being absorbed by suitable substances and thus not affecting the ecology, make it necessary nevertheless to feed the coking residues as well as the absorption products to central regenerating plants which is not possible without additional transporting means and thereby additional costs. In addition thereto, energy is required for the coking process which energy represents a cost increasing factor. The employment of this known method for industrial wastes which is furnished in barrels with different contents and unknown composition is more than problematic. It is therefore an object of the present invention to provide a method which will make it possible to introduce into the combustion chamber industrial wastes delivered with different contents and unknown composition to an incinerator plant, in such a condition and within such a period that a controllable and complete combustion will be obtained. This problem has been solved according to the present invention by a method in which the pretreatment of the waste substances varies whereas the further course of the method, however, is the same. The first method according to the invention is characterized by the following method steps:

a. The pretreatment is effected by deep freezing the waste substances;
b. the deep frozen waste substances are crushed or comminuted;
c. the comminuted waste substances are introduced into the fire or combustion chamber;
d. in the combustion chamber the course of combustion is so controlled that the combustion air determined in conformity with the hourly quantity of waste, heating value and air excess is so selected and determined that the waste substances introduced into the combustion chamber per time unit, especially those waste substances reacting at the fasttest rate, are completely burned.

The second method comprises the following method steps:

a. The pretreatment is effected by evaporating the waste substances under exclusion of air and with direct or indirect supply of volatilization heat;
b. the vapors and the evaporated residues are introduced into the combustion chamber;
c. in the combustion chamber, the course of combustion is so controlled that the quantity of combustion determined on the basis of the air introduced into the combustion chamber and based on the hourly supplied quantity of waste, the heating value and the excess air is so determined that the pretreated waste substances reacting at the fastest rate, are completely burned.

The method steps of the third method according to the invention are as follows:

a. The pretreatment is effected by intermixing the waste substances with admixed substances or with leaning substances;
b. the intermixed waste substances are introduced into the combustion chamber.
c. in the combustion chamber the course of combustion is so controlled that the quantity of combustion air introduced into the combustion chamber is based on the hourly quantity of waste substances, the heating value and the excess air is so determined and selected that the pretreated waste substances introduced per time unit, especially the waste substances reacting at the fastest rate are burned completely.

In view of the fact that in the barrels or the like wastes of unknown composition are contained, particular attention has to be paid to exposing the content of the barrels or the like. For the first, second and third methods according to the present invention, the exposing of the contents in said barrels or the like is suggested in such a way that all barrels have their discharging means provided with exit openings and that the barrel contents are compressed up to a predetermined pressure while the solid residues are conveyed to acomminuting device.

The exposing of the barrel contents may if desired be effected in a normal atmosphere. However, it is expedient to expose the barrel contents as well as the comminution of the barrels in an inert atmosphere. This possibility is included likewise in the subject matter of the present invention.

According to the first method (deep freezing) it is possible according to a further feature of the present invention to expose the contents of the barrels in such a way that the solid, liquid, or paste-like contents of the barrels are exposed in the cooling zone by splitting up the barrels or the like for instance by cutting them open.

According to the second method, according to which the pretreatment of the wastes is effected by volitalization under air exclusion under direct or indirect supply of the volatizing heat, it is suggested according to a further development of this invention prior to the volatilization of the wastes to mix the latter with additional or leaning substances.

In order to be able with the first method to carry out a time-wise controlled extension of the course of combustion over the entire band width of the prevailing wastes in such a way that the air supply corresponding to the design of the plant will always be sufficient in the fire chamber to permit burning the wastes completely and without danger, it is furthermore suggested that the granulate of the broken down barrels is independently of the contents of said barrels intermixed and the mixture is continuously fed into the fire chamber.

In order to further improve the heat value equalization obtained by mixing the granulates, it is further suggested for this method that the fixed waste parts be introduced into the cooling zone in a comminuted condition and in this condition are simultaneously undercooled with the already deep frozen liquid or paste-like mixture of wastes.

A method analogous to the heat value equalization may according to the present invention also be realized by feeding the undercooled comminuted fixed barrel contents or if desired said barrel contents together with the barrels directly into the burning device.

There will now be described the individual methods which differ from each other merely by the pretreatment of the wastes.

According to the first method, the wastes alone or together with the barrels are first deep cooled for which purpose for instance liquid nitrogen is employed with temperatures of approximately −195°C. The wastes, if desired together with the barrels, are first introduced into a cooling installation where they pass into a liquid nitrogen bath and here are undercooled to temperatures below −100°C. The wastes are thus put into the same condition which means they become hard like glass. Subsequently they are conveyed to a comminuting device which may for instance be a crusher, and are here crushed to the desired or intended granular size. With these granular sizes a dosed feeding of the waste to the fire chamber can be effected. The conveying of the waste into the fire chamber may be effected for instance by an inert gas stream by air or by other conveying means. For instance, the granulate may be fed into the fire chamber from the top while the particles drop counter to the air stream. By the density of the individual granulates and the speed of the air stream there will be determined the drop times which in conformity with the granular size and fire chamber temperature will suffice to carry out the volatilization of the granulate and the burning of the vapors down to the bottom of the fire chamber. The granulate which has not yet completely volatilized and burned may for instance finish burning for instance on a grate that will also serve for burning other solid wastes. The burning and volatilization may also be effected for instance in a rotary pipe or in a turbulence layer furnace into which the deep frozen wastes are fed directly. The granulate of the crushed barrels may independently of the contents of the barrels be intermixed and this mixture may in a continuous manner be fed into the fire chamber. In this instance the mixing chamber is likewise undercooled.

The particular advantage obtained by this pretreatement of the industrial waste is seen in the fact that wastes which in their natural condition in view of the danger of explosion cannot be intermixed, can now be intermixed whereby an equalization of the wastes with regard to their mean heating value will be effected. Also the intermixed granulates are introduced into the fire chamber within such a time unit that a controlled and complete combustion, which means a soot-free combustion, occurs.

The solid contents of the barrels and the emptied barrels which are separated at the discharging station and have been crushed in a separate device may for further improving the heat value equalization be fed directly into the above described undercooled mixing chamber and may be intermixed with the granulate therein. Only then they are introduced into the combustion chamber or directly after the crushing or comminution passed into the combustion chamber.

A second possible embodiment of the pretreatment of the wastes consists in that the wastes with or without the barrels are volatilized under exclusion of air while volatilizing heat is supplied directly or indirectly. The vapors as well as the possibly not yet volatilized residues are subsequently in a separate way introduced into the combustion chamber where they burn. With this pretreatment method, it is necessary fundamentally to distinguish between a direct and an indirect supply of volatilization heat. According to the second method, the barrels or also only the contents of the barrels are introduced for instance into an evaporization or volatilizing chamber where the heat transfer is effected primarily by radiation. The indirect heat supply is effected by heating the walls from the outside, for instance by hot flue gases, electrically or by other convenient methods. When employing a direct heating, the heat transfer is effected by heated oxygen-free gases, if desired also by liquids. Inasmuch as the melting heat of the individual substances differs in magnitude, the heat requirement determines the temperature in the volatilizing chamber, and the surface formed by the contents of the barrels determines the volatilizing speed. Regardless of whether a fast or a slow volatilization is effected, the transfer of the vapors to the fire chamber is effected in a predetermined time in order to be sure that the oxygen in the fire chamber will be sufficient for a complete combustion.

If only liquids are volatilized or evaporated, it is possible to operate at relatively low temperatures of a magnitude between 200°C and 500°C. Paste-like waste materials require somewhat higher temperatures. Solid waste maaterials might require temperatures in the evaporation chamber of a magnitude from 800° to 900°C. Inasmuch as the content of the barrels is not known, it will be appreciated that for instance at a temperature of 200°C only those liquids will evaporate which have a corresponding evaporation temperature. On the other hand, higher boiling liquids, pastes and solid substances will not volatilize. Since, however, endeavors have to be made that all contents of the barrels are fed into the combustion chamber in volatilized condition, it is necessary that the volatilizing process is effected step-wise. This may be realized for instance by causing the individual barrels successively to pass through different chambers with different high temperatures. The vapors are from the individual chambers conveyed to the fire chamber for the purpose of combustion.

The direct supply of the evaporation heat, for instance by inert gases as well as flue gases, brings about that the vapors which form are obtained in that quantity in which they are fed together with hot gas into the combustion chamber.

The third method for pretreating the wastes consists in that the waste materials prior to passing into the fire chamber are intermixed with additional or leaning substances and this mixture is then in a continuous manner conveyed to the fire chamber whereby likewise a timewise expansion of the evaporation and combustion process will be realized. As additional substances and leaning means, various substances may be employed for instance mud, ash, sand, wood shavings or similar materials. As parameters in addition to the type of material, the mixing ratio and the temperature, also for instance the pouring height, the density of the poured material, the movement of the waste in the fire chamber, etc., are to be taken into consideration. The mixture of waste and leaning means is — height per time unit — fed either directly into the combustion chamber or is first conveyed to a combustion chamber with direct or indirect heating from where the vapors are conveyed to the combustion chamber. To this end, rotary pipes, rotary tables or similar devices may be used. Leaning means such as ash or sand may, if desired, be passed through a circulatory path. For purposes of intermixing waste and leaning means, various possibilities are available. Thus the mixture may be effected in so-called paddleworms. Another possibility consists in a continuous supply of the waste materials onto a belt which passes therebelow and is covered with leaning means. When paste-like waste materials are involved, they may for instance be pressed into cavities pre-formed in the leaning substance. The wastes may, however, also be supplied into bowls or cups and together therewith fed into the combustion chamber. After the combustion operation, the cups or bowls are again withdrawn from the furnace and are charged anew. This pretreatment method of the wastes is again effected with the idea in mind that the contents of the individual barrels is unknown. In spite of this fact, a continuous feeding effected over a predetermined time may be carried out.

The discharging of the barrels is effected for instance in such a way that the barrels are first provided with discharge openings and are subsequently compressed. In this way if the barrel contents are liquid, the same will flow out within the predetermined time. On the other hand if pastes are involved the paste will, due to the pressing step be pressed out of the barrel. In this way, it is possible to combine paste-like contents with the leaning substances. With barrels with a solid content, the press will in response to a certain pressure turn itself off automatically. The entirely or partially emptied barrels are separated from the mixture consisting of waste materials and leaning materials and are conveyed to the combustion chamber or by means of a cutting or shearing device are so comminuted that they can be admitted to the mixture. Also in this instance, for operating the distribution, especially when including the comminution of the barrels, inert atmosphere is expedient. The contents of the barrels which contents are adapted to flow may also be discharged by tilting the barrels after removal of the cover or lid.

It will be appreciated that by means of the method according to the invention it is possible in an advantageous manner to carry out the combustion of industrial wastes which are furnished in barrels with unknown content. It is furthermore advantageous to effect the combustion always so that it can be controlled and will be complete to as to meet the requirements which municipalities advance in connection with incinerators with industrial wastes.

It is furthermore to be noted that while the methods as set forth above can be carried out with any suitable apparatus, an incinerator plant as set forth in my copending application, Ser. No. 435,090 — Schuster, filed Jan. 21, 1974 on even date herewith and entitled "Incinerator Plant for Pretreated Industrial Wastes" and based on German patent applications Ser. Nos. P23 03 117.6-13, P 23 62 691.7, P 23 62 690.6, P 23 62 691.7, P 23 62 690.6, and P 23 62 689.3, may advantageously be used for practicing the methods set forth above.

It is, of course, to be understood that the present invention is by no means limited to the specific examples and methods set forth above but also comprises any modifications within the scope of the appended claims.

What I claim is:

1. A method of incinerating industrial wastes fed to the incinerator in containers of different contents and of unknown composition, which includes in combination the steps of: pretreating the wastes to be incinerated by deep-freezing the same, comminuting said deep-frozen wastes and feeding the same into the combustion chamber of the incinerator, and determining the combustion air for the combustion chamber on the basis of the quantity of wastes fed per hour into the combustion chamber and on equalization based on the heating power of said wastes and in the air excess-coefficient and feeding the thus determined quantity of air into the combustion chamber of the incinerator, the quantity of combustion air being so selected that the wastes being fed into the combustion chamber of the incinerator per time unit, especially those reacting at the fastest rate, will be burned completely.

2. A method in combination according to claim 1, which includes the steps of providing the wastes containing containers with discharge openings, compressing said containers to a pressure to press at least a major portion of the wastes in said container out of the latter for feeding to the combustion chamber of the incinerator, and crushing the solid residues and feeding the same intermixed with said wastes into the combustion chamber of the incinerator.

3. A method in combination according to claim 2, in which the discharge of the wastes from the respective container therefor and the crushing of said container is effected in an inert atmosphere.

4. A method in combination according to claim 1, which includes the step of freeing the wastes from the conatiners where the deep-freezing is effected by splitting up the containers.

5. A method in combination according to claim 1, which includes the step of intermixing the deep-cooled granulates of the wastes in the deep-cooling zone prior to feeding same into the combustion chamber of the incinerator.

6. A method in combination according to claim 1, which includes the steps of reducing to a desired size the solid wastes and charging the same into the zone where the cooling is to be effected while simultaneously undercooling said reduced solid wastes and mixing same with the deep-frozen wastes.

7. A method in combination according to claim 1, in which of the non-cooled solid wastes reduced in size and the crushed container parts at least the former are fed directly to the combustion chamber of the incinerator.

* * * * *